United States Patent [19]

Brock et al.

[11] Patent Number: 5,019,304
[45] Date of Patent: May 28, 1991

[54] PROCESS FOR THE PRODUCTION OF FOAM CUSHIONS FROM DIFFERENT FLUID REACTION MIXTURES

[75] Inventors: Martin Brock, Cologne; Ralf Busch, Ketsch; Ralf Pohlig, Leichlingen, all of Fed. Rep. of Germany

[73] Assignee: Bayer Aktiengesellschaft, Bayerwerk, Fed. Rep. of Germany

[21] Appl. No.: 226,506

[22] Filed: Aug. 1, 1988

[30] Foreign Application Priority Data

Aug. 14, 1987 [DE] Fed. Rep. of Germany ....... 3727129

[51] Int. Cl.$^5$ .............................................. B29C 67/22
[52] U.S. Cl. .................................. 264/45.1; 264/46.4; 264/46.6
[58] Field of Search ...................... 264/45.1, 46.4, 46.6

[56] References Cited

U.S. PATENT DOCUMENTS

| 3,786,122 | 1/1974 | Berg | 264/46.2 |
|---|---|---|---|
| 4,190,697 | 2/1980 | Ahrens | 428/315 |
| 4,246,361 | 1/1981 | Yukuta et al. | 264/54 |
| 4,405,681 | 9/1983 | McEvoy | 264/46.4 |
| 4,714,574 | 12/1987 | Tenhagen | 264/45.1 |

FOREIGN PATENT DOCUMENTS

| 3638205 | 5/1988 | Fed. Rep. of Germany | 264/45.1 |
|---|---|---|---|
| 2272820 | 5/1975 | France . | |
| 2161375 | 1/1986 | United Kingdom . | |

*Primary Examiner*—Robert A. Dawson
*Assistant Examiner*—Allan R. Kuhns
*Attorney, Agent, or Firm*—Joseph C. Gil

[57] ABSTRACT

A process for the production of foam cushions from different fluid reaction mixtures comprising introducing a first reaction mixture and at least one other reaction mixture into a mold cavity and leaving the mixtures to react to form a cushion having zones of differing elasticity or firmness, characterized in that one of the two reaction mixtures is not introduced into the mold cavity until it has creamed up and is already viscous, and in that the second reaction mixture, which has not creamed up, is introduced at the same time or later.

3 Claims, No Drawings

PROCESS FOR THE PRODUCTION OF FOAM CUSHIONS FROM DIFFERENT FLUID REACTION MIXTURES

BACKGROUND OF THE INVENTION

The present invention relates to a process for the production of foam cushions from different fluid reaction mixtures. The resultant cushion consists of at least two foams differing correspondingly in elasticity or rigidity. Preferred are polyurethane foams. In the process, a first and at least one other reaction mixture are introduced into a mold cavity and left to react to form a cushion having zones of different elasticity or rigidity before the cushion is removed from the mold.

The production of molded parts and in particular cushions, by foaming in molds is becoming more widely used over the previously employed method of cutting. The foaming process is relatively simple and can be carried out almost loss free. When this process of foaming in the mold is employed, the cushions are either subsequently covered with a textile cover or the cover is directly back-foamed in a vacuum mold.

Various processes have been proposed for the production of molded parts composed of zones of differing rigidity.

According to EP-B1-68 820 (corresponding to U.S. Pat. No. 4,714,574), a second foam mixture is directly introduced on a first foam mixture at a time corresponding to a volumetric expansion of the first mixture of 100% to 2,300% so that one or more relatively rigid zones are formed within a relatively flexible foam. For this procedure, it is necessary to wait for the first reaction mixture to attain the necessary volumetric expansion before the second reaction mixture may be introduced. This has the undesirable effect of increasing the length of the foaming cycle in the mold. Moreover, the main aim of covering the more rigid zones with a layer of flexible foam to increase the seating comfort is difficult to achieve because the expansion of the flexible layer is limited to only small thicknesses in certain zones. Difficulties are also encountered in making these coverings sufficiently reproducible.

According to another process (U.S. Pat. No. 4,190,697), a more rigid foam formulation is introduced into the mold and allowed to start foaming. A second more flexible foam formulation is introduced when the first mixture has expanded to 10 to 80% of its full volume. This second mixture penetrates the first mixture when it is introduced and causes the first mixture to float upwards. Both mixtures then undergo reaction to produce a polyurethane foam product which has zones of differing density. This process has the disadvantage that penetration of the first reaction mixture introduced and the flow of second reaction mixture under the first mixture take place in an irregular fashion so that the properties of the molded parts (particularly the indentation hardness) obtained are not sufficiently reproducible.

None of these known processes suggest how, in the production of highly contoured cushions such as seating cushions with raised side parts, it is possible to prevent the reaction mixture in the region of the flat central part of the seat from flowing down into the parts of the mold cavity which are to form the side parts. In practice problem has been solved by placing barriers at the bottom of the mold cavity to limit the flow of the reaction mixture which is to form the flat central part of the seat, so that cushions with zones of differing hardness can be obtained in a reproducible manner. Barriers of this kind naturally increase the cost of the mold and leave grooves, (so called "pipes") in the part of the cushion in which they are placed. These grooves are in many cases covered up to some extent by providing beading in the form of piping on the cover in these positions. These grooves are, however, weak points which form the starting points for cracks when subjected to excessive loads.

The problem therefore arose of providing a process by which foam cushions of the type defined above may be produced more reproducibly and more simply, and in particular with shorter operating cycles, and which would also be able to withstand exceptional loads.

DESCRIPTION OF THE INVENTION

The above problems are solved by not introducing one of the two reaction mixtures into the mold cavity until it has already started to cream up and becomes viscous. A measurement therefor is the decrease in density and the increase in volume. The density should decrease at least to one third of that of the uncreamed mixture, which corresponds to an increase in volume of about 200%. The second reaction mixture, which has not yet creamed up, is introduced at the same time or later. As a result, the reaction mixture which has started to cream up no longer flows outwards to any significant extent (if at all) when it is introduced into the mold. Its distribution in the direction of width takes place by foaming rather than flow and serves as boundary to the reaction mixture which has not yet creamed up. The new process in particular enables the foam which is produced from the creamed up reaction mixture to be covered with the reaction mixture which has not yet creamed up because the reaction mixture which has not creamed up still has a higher density when it is introduced into the mold and causes the creamed reaction mixture to float up.

If a reaction mixture, particularly the one which has creamed up, is required to be distributed over relatively large areas of the mold cavity, it must be distributed by means of the device used for its introduction into the mold. For this purpose, the device used for introducing the mixture, or the applicator nozzle, is arranged to travel over the said area while it introduces the reaction mixture. In order to achieve the necessary distribution, the reaction mixture may be applied, for example, in lines or spirals or it may be applied pointwise at different points of the area to be covered. Introduction of a reaction mixture which has already started to cream up shortens the operating cycles.

The new process is particularly advantageous for the production of cushions composed of more than two different foams. For such a process, the different reaction mixtures, optionally including more than one mixture which has already creamed up, are introduced into the mold side by side, and in particular in the form of straight or curved lines. The different reaction mixtures may also be introduced pointwise and in particular in different quantities in a suitable pattern to produce the optimum seating comfort. In all cases, the state of creaming, i.e., the viscosity, at the moment of introduction into the mold must be adjusted to the flow paths along which the mixtures are still required to travel. This may best be determined empirically by experiments.

It has been found particularly advantageous to introduce a creamed up reaction mixture into the mold when its density has already reduced by at least ⅔.

Keeping to this minimum value ensures to some extent that the reaction mixture will not flow excessively. The density is a measure of the viscosity and in a mixture which has not yet reacted this can be roughly determined. In a creamed up mixture, it can be estimated from the increase in volume.

If the new process is employed for the production of seating cushions with raised side parts of the kind conventionally used on seats in vehicles, the creamed reaction mixture is introduced into the regions of the mold corresponding to the side parts and the mixture which has not creamed up is introduced into the region corresponding to the central part of the seat. When this procedure is employed, the heavier reaction mixture which has not creamed up will flow from the center of the seat area into the side areas and will flow underneath the lighter, creamed reaction mixture so that the more rigid foam produced from the latter will be covered by the softer, more flexible foam after foaming.

The invention is further illustrated, but is not intended to be limited by the following examples in which all parts and percentages are by weight unless otherwise specified.

EXAMPLE

A seating cushion for motor vehicles comprising a central seating area of softer flexible foam and raised side areas of firmer flexible foam is produced by backfoaming a covering material which has been cut to shape.

Two cold foam formulations are used.

The first reaction mixture, which is to form the softer foam for the central region of the seat has the following composition:

Component A 100 parts by weight of polyether, obtained by the addition of propyleneoxide followed by ethyleneoxide to trimethylolpropane having a functionality of 3 and a primary OH content of about 80% by weight and an OH number of about 30;

3 1 parts by weight of water:

0.2 parts by weight of bis-dimethylaminoethylether;

0.4 parts by weight of commercial foam stabilizer consisting of a mixture of low molecular weight siloxanes (stabilizer KS 43 available from Bayer AG, West Germany);

0.8 parts by weight of triethylenediamine (33% in dipropylene glycol).

Component B 45.3 parts by weight of an isocyanate with an isocyanate content of about 32.5% (isocyanate index of the system was 85), containing about 65% by weight of 4,4'-diphenylmethane diisocyanate and about 20% by weight of 2,4'-diphenylmethane diisocyanate and about 15% by weight of polymeric MDI.

The second reaction mixture which is to form the firmer foam for the side areas has the following composition:

Component A 100 parts by weight of polyether obtained by the addition of propyleneoxide followed by ethyleneoxide to trimethylolpropane having a functionality of 3 and a primary OH content of about 80% by weight and an OH number of about 30;

3.1 parts by weight of water;

0.2 parts by weight of bis-dimethylaminoethylether:

0.4 parts by weight of commercial foam stabilizer consisting of a mixture of low molecular weight siloxanes.

(Stabilizer KS 43 of Bayer AG);

0.8 parts by weight of triethylenediamine (33% in dipropyleneglycol);

4.0 parts by weight of the adduct of $CO_2$ to N-methylethanolamine.

Component B 70.6 parts by weight of an isocyanate with an isocyanate content of about 32.5% (isocyanate index was 110), containing about 65% by weight of 4,4'-diphenylmethane diisocyanate and about 20% by weight of 2,4'-diphenylmethane diisocyanate and about 15% by weight of polymeric MDI.

The cut piece of covering material is accurately placed against the wall of the cavity of a vacuum mold and thereafter the reaction mixture which is to form the softer foam (compression resistance according to DIN 53 577 of 3.3 kPa) is applied to the region of the cavity corresponding to the central part of the seat and at the same time the reaction mixture which is to form the firmer foam (compression resistance according to DIN 53 577 7.3 of kPa) is applied to the side regions.

The creamed up reaction mixture which is to form the central part of the seat has a density of about 0.3 kg/dm$^3$ when introduced into the mold and is applied in three lines in the region of the central area of the seat, one line being applied centrally and the two other lines at a distance of 5 cm from the edge of the side part. The other reaction mixture, which has not creamed up, is introduced at the same time into the side regions of the mold cavity. The reaction mixture which has not creamed up, and which is heavier at its time of introduction into the mold (density 0.9 kg/dm$^3$) than the creamed up reaction mixture flows underneath the creamed up mixture so that the seating cushion produced has lateral zones of a comparatively rigid foam core covered with a softer foam.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of foam cushions from different fluid reaction mixtures comprising introducing a first reaction mixture and at least one other reaction mixture into a mold cavity and leaving the mixtures to react to form a cushion having zones of differing elasticity or firmness, characterized in that one of the two reaction mixtures is not introduced into the mold cavity until it has creamed up and is already viscous, and in that the second reaction mixture, which has not creamed up, is introduced at the same time or later.

2. The process of claim 1, characterized in that the creamed up reaction mixture has already undergone a reduction in density by at least two thirds when it is introduced into the mold cavity.

3. The process of claim 1 characterized in that the creamed up reaction mixture is introduced into the areas corresponding to the side parts and the mixture which has not creamed up is introduced into the region corresponding to the central part of the seat.

* * * * *